United States Patent
Shibata et al.

(10) Patent No.: US 8,002,474 B2
(45) Date of Patent: Aug. 23, 2011

(54) WHEEL BEARING APPARATUS

(75) Inventors: Kiyotake Shibata, Iwata (JP); Masahiro Kiuchi, Osaka (JP); Yoshiaki Kuchiki, Iwata (JP)

(73) Assignee: NTN Corporation (JP)

( * ) Notice: Subject to any disclaimer, the term of this patent is extended or adjusted under 35 U.S.C. 154(b) by 3 days.

(21) Appl. No.: 12/616,167

(22) Filed: Nov. 11, 2009

(65) Prior Publication Data
US 2010/0054647 A1 Mar. 4, 2010

Related U.S. Application Data

(63) Continuation of application No. PCT/JP2008/001177, filed on May 9, 2008.

(30) Foreign Application Priority Data

May 11, 2007 (JP) ................................. 2007-127290
Jun. 13, 2007 (JP) ................................. 2007-155902

(51) Int. Cl.
*F16C 13/00* (2006.01)
(52) U.S. Cl. ...................................................... 384/544
(58) Field of Classification Search .................. 384/544, 384/589, 625
See application file for complete search history.

(56) References Cited

U.S. PATENT DOCUMENTS

| 5,411,336 | A * | 5/1995 | Takemura et al. ............. 384/565 |
| 6,357,925 | B2 * | 3/2002 | Tajima et al. .................. 384/544 |
| 6,666,303 | B2 * | 12/2003 | Torii et al. ................... 188/18 A |
| 2003/0232681 | A1 * | 12/2003 | Matsuyama et al. .......... 475/220 |
| 2006/0165332 | A1 | 7/2006 | Terada et al. |
| 2007/0149299 | A1 * | 6/2007 | Azuma et al. ................. 464/179 |

FOREIGN PATENT DOCUMENTS

| JP | 2000-110840 | 4/2000 |
| JP | 2003-184897 | 7/2003 |
| JP | 2006-188187 | 7/2006 |
| JP | 2006-188188 | 7/2006 |
| JP | 2006-275174 | 10/2006 |

* cited by examiner

*Primary Examiner* — Thomas R Hannon
(74) *Attorney, Agent, or Firm* — Harness, Dickey & Pierce, P.L.C.

(57) ABSTRACT

A vehicle wheel bearing apparatus has an outer member, an inner member with at least one inner ring, double row rolling elements, and a constant velocity universal joint torque transmittably inserted into a wheel hub and axially separably connected by a securing nut. A shoulder of an outer joint member of the constant velocity universal joint abuts against a larger end face of the inner ring. The larger end face of the inner ring is formed as a ground surface. An end face of the shoulder of the outer joint member abutted against the larger end face is formed as a ground surface or a lathe-turned surface. The surface roughness Ra of at least the larger end face of the inner ring is limited to a range within 0.1~0.3.

9 Claims, 4 Drawing Sheets

[Fig 1]
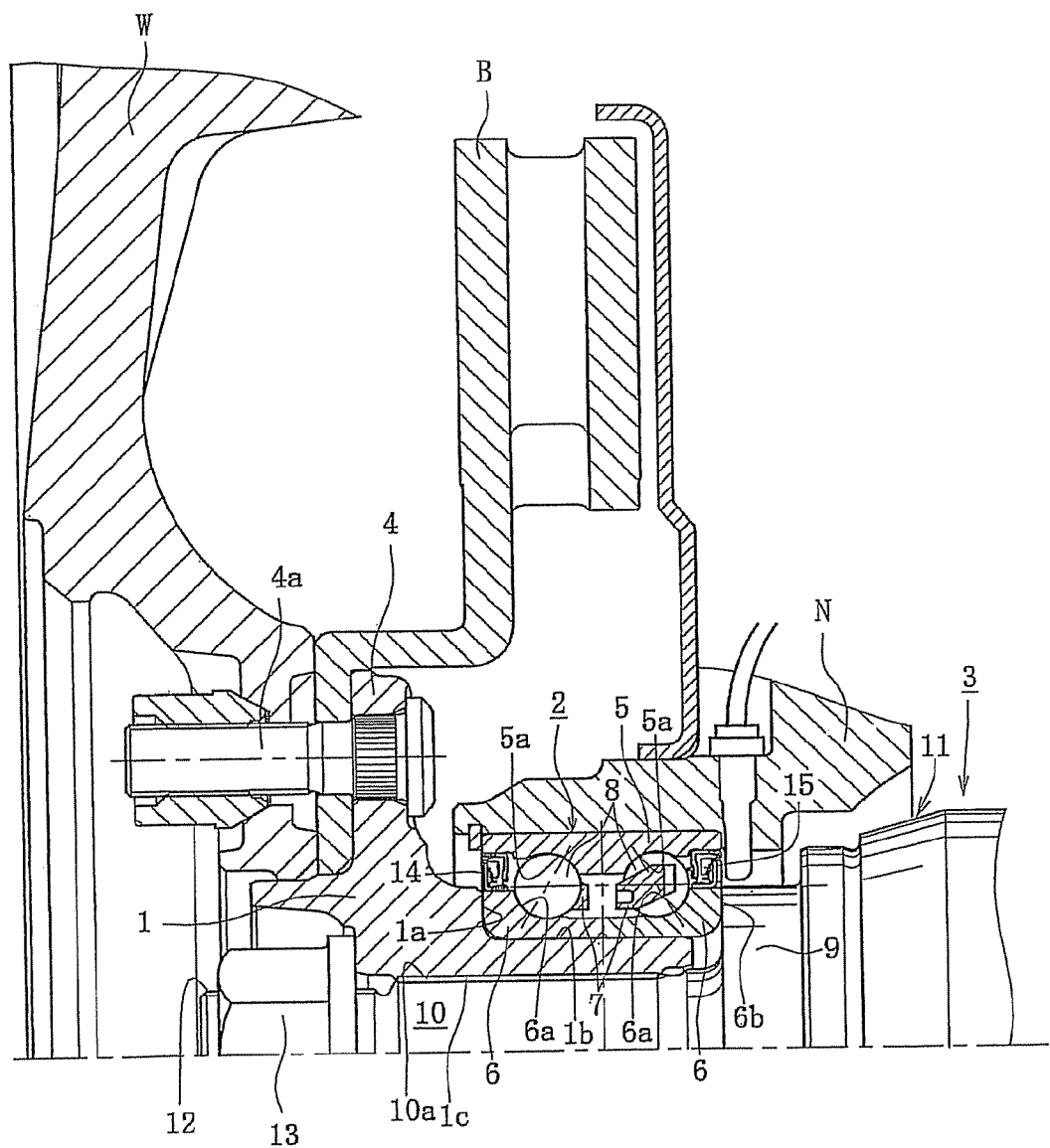

[Fig 2]
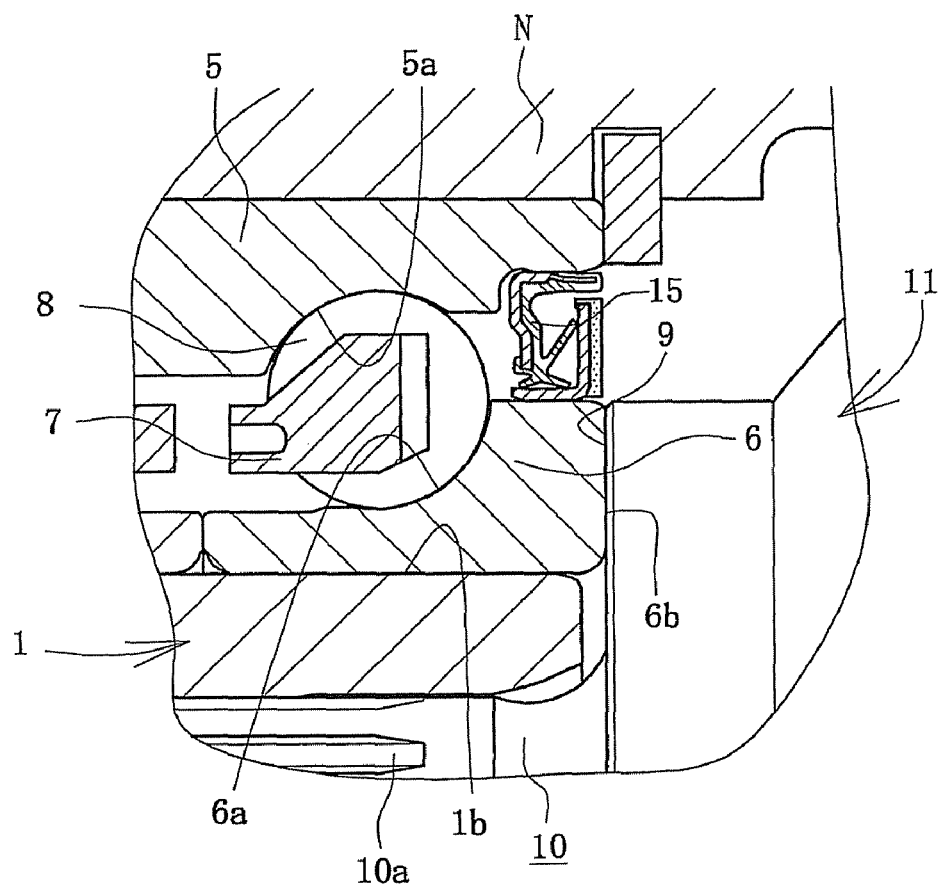

[ Fig 3 ]
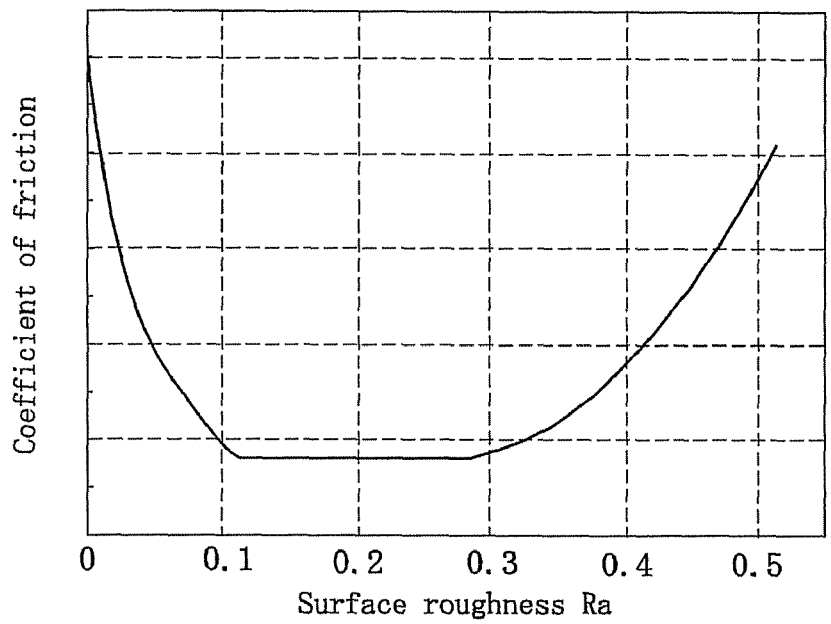
[ Fig 4 ]
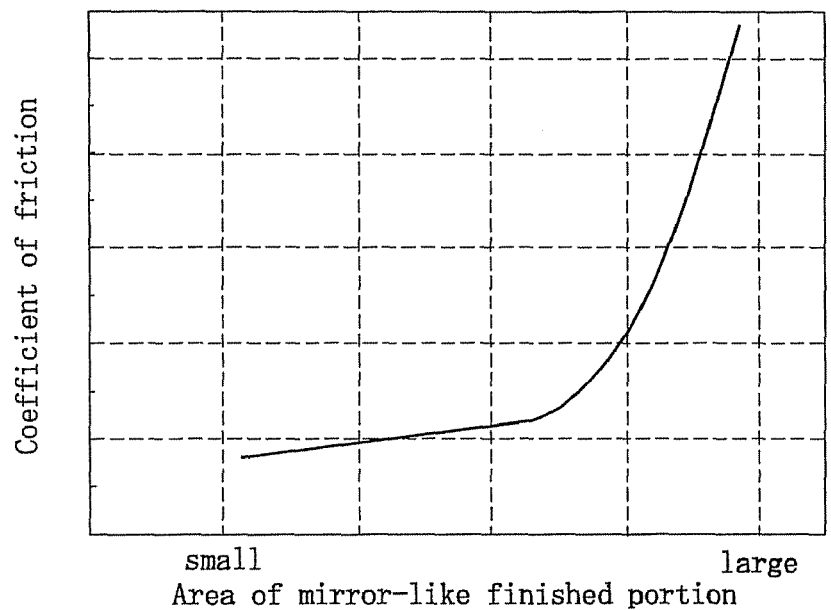

[ Fig 5 ]
PRIOR ART
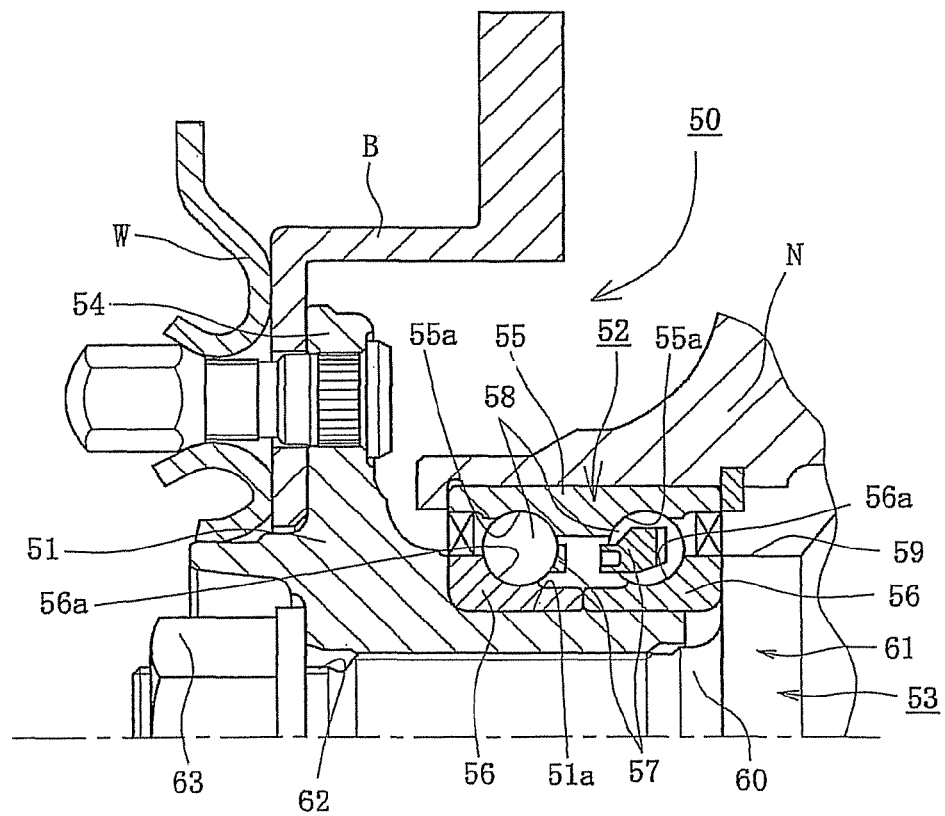
[ Fig 6 ]
PRIOR ART
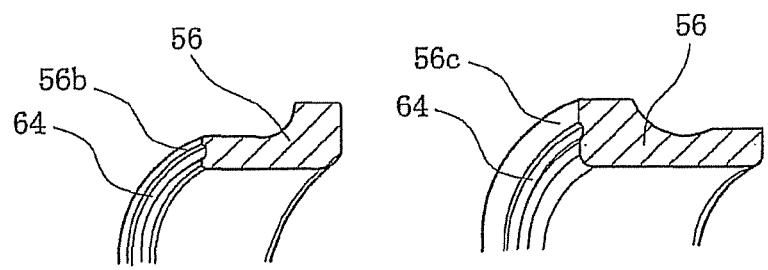
(a)　　　　　　　　(b)

WHEEL BEARING APPARATUS

CROSS-REFERENCE TO RELATED APPLICATIONS

This application is a continuation of International Application No. PCT/JP2008/001177, filed May 9, 2008, which claims priority to Japanese Application Nos. 2007-127290, filed May 11, 2007 and 2007-155902, filed Jun. 13, 2007. The disclosures of the above applications are incorporated herein by reference.

FIELD

The present disclosure relates to a vehicle wheel bearing apparatus that supports driving wheels of a vehicle such as an automobile and, more particularly, to a wheel bearing apparatus that rotationally supports driving wheels (front wheels of FF vehicle, rear wheels of FR or RR vehicle and whole wheels of 4 WD vehicle) mounted on an independent suspension relative to the suspension.

BACKGROUND

In a power transmitting apparatus that transmits engine power of a vehicle, such as an automobile, to its wheels, it is necessary not only to transmit the power from the engine to wheels but to enable radial and axial displacements. Moment displacement from the wheels is caused by bounds or turns of a vehicle during running on a rough road. One end of a drive shaft arranged between an engine side and a driving wheel side is connected to a differential gear unit, via a constant velocity universal joint of the sliding type. The other end of the drive shaft is connected to a driving wheel via a wheel bearing apparatus including a constant velocity universal joint of the secured type.

Various types of wheel bearing apparatus, for example as shown in FIG. 5, have been previously proposed. The wheel bearing apparatus 50 comprises a wheel hub 51 where a wheel W and a brake rotor B are mounted. A double row rolling bearing 52 rotatably supports the wheel hub 51. A secured type constant velocity universal joint 53 to transmit power to a drive shaft (not shown) is coupled with the wheel hub 51.

The wheel hub 51 is integrally formed at one end with a wheel mounting flange 54. The wheel mounting flange 54 mounts the wheel W and the brake rotor B. A cylindrical portion 51a axially extends from the wheel mounting flange 54.

The double row rolling bearing 52 is formed by a double row angular contact ball bearing. The bearing includes an outer ring 55 mounted between a knuckle N, forming part of the suspension apparatus and the cylindrical portion 51a of the wheel hub 51. The outer ring inner circumference includes double row outer raceway surfaces 55a. A pair of inner rings 56, 56, including their outer circumferences with inner raceway surfaces 56a, 56a, is arranged opposite to the double row outer raceway surfaces 55a, 55a. The double row balls 58, 58 are rollably contained, via cages 57, between the inner and outer raceway surfaces 55a, 55a and 56a, 56a.

The constant velocity universal joint 53 includes an outer joint member 61 with a cup shaped mouth portion (not shown), a shoulder 59 that forms a bottom of the mouth portion, and a shaft portion 60 that axially extends from the shoulder 59. The outer joint member 61 is inserted into the wheel hub 51 via a serration in a torque transmittable fashion. The shaft portion 60 is fit into the wheel hub 51 until the shoulder 59 abuts against the inner ring 56 of the double row rolling bearing 52. A securing nut 63 is fastened onto an outer thread 62 formed on one end of the shaft portion 60. A predetermined fastening torque on the nut 63 axially, separably, connects the wheel hub 51 and the outer joint member 61.

It is known that a large torque is transmitted to the wheel W, via a sliding type constant velocity universal joint (not shown), from the engine during a low engine speed range such as in starting of the vehicle. Thus, torsion is created in the drive shaft. As the result, torsion is also created in the inner ring 56 of the double row rolling bearing 52 that supports the driving shaft. When a large torsion force is created in the drive shaft, a so-called "stick-slip sound" is generated due to a sudden slip between abutting surfaces of the outer joint member 61 and the inner ring 56.

To cope with this problem in the prior art wheel bearing apparatus 50, a surface treatment to reduce a frictional resistance is formed on a part abutting against the shoulder 59 of the outer joint member 61. More particularly, as shown in FIGS. 6(a) and 6(b), grease grooves 64 are circumferentially formed on the end faces 56b, 56c of the inner ring 56. These grooves 64 help introduce grease into the interface between mutually adjacent surfaces. Thus, this reduces the frictional resistance. Accordingly, a smooth slippage can be caused therebetween and thus the generation of the stick-slip sound can be suppressed. Reference Patent Document 1: Japanese Laid-open Patent Publication No. 110840/2000.

However, these surface treatments made in plural parts increase the machining steps and complicate the process management. Thus, they prevent a reduction of a manufacturing cost.

Additionally in the prior art wheel bearing apparatus, the securing nut 63 is fastened to the outer thread 62 of the shaft portion 60 of the outer joint member 61. A fastening force (axial force) exceeding a predetermined level is required to adjust and control an amount of pre-pressure of the double row rolling bearing 52. Although it is possible to reduce the frictional resistance at first by grease applied between the abutting interfaces, it is believed that the applied grease would be forced out by the fastening force. Thus, it is difficult to keep the friction reducing effect for a long term.

SUMMARY

It is, therefore, an object of the present disclosure to provide a wheel bearing apparatus for a vehicle that can achieve a smooth slippage between mutually abutting members and thus preventing the generation of a stick-slip sound.

In order to achieve the object of the present disclosure, a vehicle wheel bearing apparatus is provided comprising an outer member integrally formed on its inner circumference with double row outer raceway surfaces. An inner member includes a wheel hub integrally formed on one end with a wheel mounting flange. Its other end includes a cylindrical portion. At least one inner ring is press fit onto the cylindrical portion of the wheel hub. The inner member is formed with double row inner raceway surfaces arranged opposite to the double row outer raceway surfaces. Double row rolling elements are rollably contained between the double row outer and inner raceway surfaces. A constant velocity universal joint is torque transmittably inserted into the wheel hub and is axially separably connected to it by a securing nut. A shoulder of an outer joint member of the constant velocity universal joint abuts against a larger end face of the inner ring. The larger end face of the inner ring is formed as a ground surface. An end face of the shoulder of the outer joint member abutted against the larger end face is formed as a ground surface or a lathe-turned surface. The surface roughness (Ra) of at least the larger end face of the inner ring is limited to a range within 0.1~0.3.

A wheel bearing apparatus for a vehicle comprises an outer member, an inner member, double row rolling elements, and a constant velocity joint. The inner member includes a wheel hub with at least one inner ring press fit onto the wheel hub. The double row rolling elements are rollably contained between the outer and inner raceway surfaces. The constant velocity universal joint is axially separably connected to the wheel hub by a securing nut. A shoulder of the outer joint member of the constant velocity universal joint abuts against a larger end face of the inner ring. The larger end face of the inner ring is formed with a ground surface. An end face of the shoulder of the outer joint member that abuts against the larger end face is formed with a ground surface or a lathe-turned surface. The surface roughness (Ra) of at least the larger end face of the inner ring is limited to a range within 0.1~0.3. Thus, it is possible to provide a wheel bearing apparatus that can reduce the coefficient of friction, achieve a smooth slippage between mutually abutting members and prevent the generation of a stick-slip sound for a long term.

At least one abutting surface of the larger end face of the inner ring and the end face of the shoulder of the outer joint member is lap finished. This reduces the coefficient of friction, achieve a smooth slippage between mutually abutting members and prevent the generation of the stick-slip sound for a long term.

The larger end face of the inner ring is grounded and lap finished after grinding. This reduces a mirror-like finished portion formed by grinding and increases micro-stripe traces. Thus, it is possible to reduce the coefficient of friction and achieve smooth slippage between mutually abutting members.

The surface roughness (Ra) of the larger end face of the inner ring is limited to 0.7 or less. This prevents catching between surfaces caused by irregularities and thus surely prevents the generation of the stick-slip sound.

The end face of the shoulder of the outer joint member is ground or lathe-turned. The end face of the shoulder of the outer joint member that abuts against the larger end face of the inner ring is formed with concentric grinding traces or turning traces. This prevents catching between surfaces caused by irregularities and surely prevents the generation of the stick-slip sound.

An outer circumference of a shaft portion of the outer joint member is formed with a serration having a helix angle inclined at a predetermined angle relative to an axis of the shaft portion. This prevents the generation of sudden slip between abutting surfaces of the outer joint member and the inner ring. Also, it prevents the generation of the stick-slip sound even when a large torsional force is created in the drive shaft.

The wheel bearing apparatus for a vehicle of the present disclosure may be applied to a so-called "first generation type" where the inner member includes a pair of inner rings press fit onto the cylindrical portion of the wheel hub.

The wheel bearing apparatus for a vehicle of the present disclosure may be applied to a so-called "third generation type" where the outer member is integrally formed with a body mounting flange on its outer circumference. The inner member includes the wheel hub directly formed with an inner raceway surface on its outer circumference. The inner raceway surface is arranged opposite to one of the double row outer raceway surfaces. The inner ring is formed with an inner raceway surface on its outer circumference. The inner raceway surface is arranged opposite to the other of the double row outer raceway surfaces.

A securing nut is fastened to the outer joint member with a predetermined fastening torque to connect the outer joint member to the wheel hub under a condition where a predetermined pre-pressure is applied to a bearing. This improves the rigidity and the durability of the wheel bearing.

The wheel bearing apparatus for a vehicle of the present disclosure comprises an outer member integrally formed with double row outer raceway surfaces on its inner circumference. An inner member includes a wheel hub integrally formed on one end with a wheel mounting flange. The other end includes a cylindrical portion. At least one inner ring is press fit onto the cylindrical portion of the wheel hub. The inner member is formed with double row inner raceway surfaces arranged opposite to the double row outer raceway surfaces. Double row rolling elements are rollably contained between the double row outer and inner raceway surfaces. A constant velocity universal joint is torque transmittably inserted into the wheel hub. It is axially separably connected to the wheel hub by a securing nut. A shoulder of the outer joint member of the constant velocity universal joint abuts against a larger end face of the inner ring. The larger end face of the inner ring is formed as a ground surface. An end face of the shoulder of the outer joint member that abuts against the larger end face is formed as a ground surface or a lathe-turned surface. The surface roughness (Ra) of at least the larger end face of the inner ring is limited to a range within 0.1~0.3. Thus, it is possible to provide a wheel bearing apparatus that can reduce the coefficient of friction, achieve a smooth slippage between mutually abutting members and prevent the generation of a stick-slip sound for a long term.

A wheel bearing apparatus for a vehicle comprises a wheel hub integrally formed on one end with a wheel mounting flange. The other end includes a cylindrical portion. A wheel bearing is press fit onto the cylindrical portion of the wheel hub via a predetermined interference. A constant velocity universal joint is torque transmittably inserted into the wheel hub. The constant velocity universal joint is axially separably connected to the wheel hub by a securing nut. The wheel bearing includes an outer member integrally formed with double row outer raceway surfaces on its inner circumference. A pair of inner rings are formed with inner raceway surfaces on their outer circumferences. The inner raceway surfaces are arranged opposite to the double row outer raceway surfaces. Double row rolling elements are rollably contained between the double row outer and inner raceway surfaces. A shoulder of an outer joint member of the constant velocity universal joint abuts against a larger end face of the inner ring. An outer circumference of a shaft portion of the outer joint member is formed with a serration having a helix angle inclined at a predetermined angle relative to an axis of the shaft portion. The larger end face of the inner ring is formed as a ground surface. An end face of the shoulder of the outer joint member that abuts against the larger end face is formed as a ground surface or a lathe-turned surface. The surface roughness (Ra) of at least the larger end face of the inner ring is limited to a range within 0.1~0.3.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a preferred embodiment of the vehicle wheel bearing apparatus.

FIG. 2 is a partially enlarged view of FIG. 1.

FIG. 3 is a graph of a relationship between the surface roughness and the coefficient of friction of a larger end face of an inner ring.

FIG. 4 is a graph of a relationship between the area of the mirror-like finished portion and the coefficient of friction of a larger end face of an inner ring.

FIG. 5 is a longitudinal section view of a prior art vehicle wheel bearing apparatus.

FIG. 6(a) is a partially enlarged perspective view of FIG. 5 of a grease groove formed in a smaller end face of the inner ring.

FIG. 6(b) is a partially enlarged perspective view of a grease groove formed in a larger end face of the inner ring.

DETAILED DESCRIPTION

A preferable embodiment of the present disclosure will be described with reference to the drawings.

FIG. 1 is a longitudinal section view of one preferred embodiment of the vehicle wheel bearing apparatus. FIG. 2 is a partially enlarged view of FIG. 1. FIG. 3 is a graph showing a relationship between the surface roughness and the coefficient of friction of a larger end face of an inner ring. FIG. 4 is a graph showing a relationship between the area of the mirror-like finished portion and the coefficient of friction of a larger end face of an inner ring. In the description below, the term "outer side" of the apparatus denotes a side that is positioned outside of the vehicle body. The term "inner side" of the apparatus denotes a side that is positioned inside of the body when the bearing apparatus is mounted on the vehicle body.

The vehicle wheel bearing apparatus of the present disclosure includes a wheel hub 1 on which a wheel W and a brake rotor B are mounted at one end. A wheel bearing 2 rotationally supports the wheel hub 1. A secured type constant velocity universal joint 3 transmits power to a drive shaft (not shown).

The wheel hub 1 has a wheel mounting flange 4 integrally formed at the outer side end. The wheel W and the brake rotor B are mounted on the mounting flange 4. A cylindrical portion 1b axially extends from the wheel mounting flange 4, via shoulder 1a. The wheel hub 1 is formed with a serration (or spline) 1c on its inner circumference. The serration (or spline) 1c transmits torque. Hub bolts 4a are equidistantly arranged along the outer circumference of the mounting flange for fastening the wheel W and the brake rotor B.

The wheel bearing 2 includes an outer member (outer ring) 5 formed with double row outer raceway surfaces 5a, 5a on its inner circumference. The outer member 5 is mounted between a knuckle N, forming part of a suspension apparatus, and the cylindrical portion 1b. A pair of inner rings 6, 6 are formed with inner raceway surfaces 6a, 6a on their inner circumferences. The inner raceway surfaces 6a, 6a are arranged opposite to the double row outer raceway surfaces 5a, 5a. Double row rolling elements (balls) 8, 8 are rollably contained between the outer and inner raceway surfaces 5a, 5a and 6a, 6a via cages 7. The wheel bearing 2 is a double row angular contact ball bearing of a so-called "back-to-back duplex type". A larger end face of the outer side inner ring 6 abuts against the shoulder 1a of the wheel hub 1. The smaller end faces of the pair of inner rings 6, 6 abut against each other. Seals 14, 15 are mounted on both ends of the outer member 5 to prevent leakage of lubricating grease contained within the bearing as well as to prevent entry of rain water or dusts from the outside.

The constant velocity universal joint 3 includes an outer joint member 11 with a shoulder 9 that forms a bottom of a cup shaped mouth portion (not shown). A shaft portion 10 axially extends from the shoulder 9. The shaft portion 10 is formed with a serration (or spline) 10a on its outer circumference. The serration (or spline) 10a engages the serration 1c of the wheel hub 1. The serration 10a has a helix angle inclined at a predetermined angle relative to an axis of the shaft portion. The shaft portion 10 is inserted into the wheel hub 1 until the shoulder 9 of the outer joint member 11 abuts against the inner side inner ring 6. Thus, the shaft portion 10 is press-fit into the serration 1c of the wheel hub 1. A securing nut 13 is fastened to an outer thread 12 formed on the end of the shaft portion 10 of the outer joint member 11. A predetermined fastening torque is used to connect the outer joint member 11 to the wheel hub 1 under a condition where a predetermined pre-pressure is applied to the bearing 2. The pre-pressure is applied to the fitting portion between the serrations 1c, 10a and eliminates a play in a circumferential direction between them. Thus, it is possible to prevent the generation of a sudden slip between abutting surfaces of the outer joint member and the inner ring. Additionally, it prevents the generation of a stick-slip sound even when a large torsion is created in the drive shaft. Also, it improves the rigidity and the durability of the wheel bearing.

The wheel hub 1 is made of medium high carbon steel such as S53C including carbon of 0.40~0.80% by weight. It is hardened by high frequency induction hardening in a region from the shoulder 1a to the cylindrical portion 1b to have a surface hardness of 58~64 HRC. Such a high frequency hardening increases the mechanical strength relative to the rotary bending load applied to the wheel mounting flange 4. Also, it improves the anti-fretting property of the cylindrical portion 1b of the wheel hub 1. The outer member 5, inner ring 6 and rolling elements 8 are made of high carbon chrome steel such as SUJ2. They are hardened to their core portions by dip quenching to have a hardness of 58~64 HRC. In addition, the outer joint member 11 is made of medium high carbon steel such as S53C including carbon of 0.40~0.80% by weight. It is hardened by high frequency induction hardening in a region from the shoulder 9 to the shaft portion 10 to have a surface hardness of 58~64 HRC.

The shoulder 9 of the outer joint member 11 is formed by grinding or turning. The larger end face 6b of the inner side inner ring 6 is formed by grinding. It is believed that the stick-slip sound is generated by discontinuous slippage between the shoulder 9 and the larger end face 6b. The generation of the stick-slip sound could be suppressed by enabling the abutting surfaces to smoothly slip. The applicant has noticed that the finished conditions of the larger end face 6b of the inner side inner ring 6 has demonstrated a relationship between the surface roughness and the coefficient of friction of the larger end face 6b of the inner side inner ring 6.

FIG. 3 is a graph illustrating the relationship between the surface roughness and the coefficient of friction of the larger end face 6b of the inner side inner ring 6. As clearly shown in this graph, it is found from a bench torsion test performed by the applicant that the stick-slip sound tends to be easily generated when the surface roughness Ra of the larger end face 6b of the inner side inner ring 6 is smaller than 0.1. Thus, the larger end face 6b is finely finished too much. This is because the too finely finished larger end face 6b tends to stick to the abutting surface of the shoulder 9. Thus, it is difficult to separate the two when the torsional force is applied to them. Accordingly, the stick-slip sound will be generated instantaneously when the stuck surfaces are released. It has also been found that the stick-slip sound is generated by a catching between surfaces caused by their irregularities when the surface roughness Ra is worsen to exceed 0.3. The character "Ra" is one of roughness parameters of JIS (JIS B0601-1994) and denotes the arithmetic average roughness i.e. an average of an absolute value deviation from the average line.

From the above description, when the end face of the shoulder 9 of the outer joint member 11 is formed as a ground surface or a lathe-turned surface, especially when it is formed as a ground surface, it is possible to realize smooth slippage, between the larger end face 6b of the inner side inner ring 6 and the shoulder 9 of the outer joint member 11, by reducing the coefficient of friction while limiting the surface roughness Ra of the larger end face 6b to a range of 0.1~0.3. Thus, it is possible to provide a wheel bearing apparatus that can effectively prevent the generation of the stick-slip sound for a long term.

In addition, applicant especially noticed the finished surface condition of the larger end face 6b of the inner side inner ring 6. In order to obtain smooth slippage between the abutted surfaces, applicant found that the generation of stick-slip sound is related to a mirror-like finished portion of the larger end face 6b. It has been found that the ground surface of the larger end face 6b is formed with a large number of irregularly extending micro-stripe traces and smooth mirror-like finished portions, when it is observed under a microscope. Furthermore, it has been found that the surface of the larger end face 6b, when it is ground by width grinding, has a large rate of the mirror-like finished portion. The mirror-like finished portion is further increased by improving the surface roughness. From results of the bench torsion test performed by applicant, it was found that the mirror-like finished portion tends to stick to the mating ground surface of the shoulder 9 of the outer joint member 11. Additionally, the stick-slip sound is generated instantaneously when the abutted surfaces are released from the stuck condition.

FIG. 4 is a graph illustrating a relationship between the area of the mirror-like finished portion and the coefficient of friction of the larger end face 6b of the inner side inner wheel 6. As can be seen from this graph, an increase of the area of the mirror-like finished portion causes sudden increase in the coefficient of friction in the larger end face 6b formed by the micro-stripe traces and smooth mirror-like finished portions. Accordingly, it is preferable to perform lapping on the larger end face 6b of the inner side inner ring 6 after performing grinding on the inner ring 6. The lapping performed on the larger end face 6b reduces a rate of the mirror-like finished portions in the larger end face 6b. On the contrary, a rate of the micro-stripe traces is increased and thus the coefficient of friction is reduced. Accordingly, it is possible to obtain smooth slippage between the abutted surfaces and thus to prevent the generation of the stick-slip sound.

Although it is described to perform the lapping after the grinding, the lapping may be performed after heat treatment of the inner ring 6. However, it is preferable to suppress the surface roughness Ra at 0.7 to prevent the generation of the stick-slip sound by catching between abutted surfaces caused by irregularities on their surface.

The shoulder 9 of the outer joint member 11 has a ground surface. At least the larger end face 6b of the inner side inner ring 6 is lapped. The mirror-like finished portions are reduced and the micro-stripe traces are increased. Thus, the coefficient of friction is reduced to enable the abutted surfaces to smoothly slip and to prevent the generation of the stick-slip sound. When the shoulder 9 of the outer joint member 11 is ground, it is preferable to simultaneously perform grinding on both the surface of the outer joint member 11 that abut against the larger end face 6b and an outer circumferential surface of the outer joint member 11. This forms concentric grinding traces on the end face of the shoulder 9 of the outer joint member 11 that abuts against the larger end face 6a of the inner side inner ring 6. Accordingly, this prevents catching between surfaces caused by irregularities and thus surely prevents the generation of the stick-slip sound.

Although illustrated and described with a double row angular contact ball bearing using balls as rolling elements, it is possible to apply the present disclosure to double row tapered roller bearings using tapered rollers as the rolling elements. In addition, although the illustrated wheel bearing apparatus is of the first generation type, it is possible to apply the present disclosure to all the first to third generation types where an outer joint member of a constant velocity universal joint is connected to a wheel bearing apparatus and a pre-pressure is applied to the bearing by fastening a securing nut to the outer joint member.

The present disclosure can be applied to a wheel bearing apparatus with a wheel hub, an inner ring or rings press fit thereon, and an outer joint member inserted into the wheel hub that abuts against the inner ring, and the inner ring(s) are secured by a securing nut to be fastened to the outer joint member.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalent.

What is claimed is:

1. A vehicle wheel bearing apparatus comprising:
   an outer member integrally formed with double row outer raceway surfaces on its inner circumference;
   an inner member including a wheel hub and at least one inner ring, said wheel hub is integrally formed on one end with a wheel mounting flange and on an other end with a cylindrical portion, the at least one inner ring is press fit onto the cylindrical portion of the wheel hub, the inner member is formed with double row inner raceway surfaces arranged opposite to the double row outer raceway surfaces;
   double row rolling elements are rollably contained between the double row outer and inner raceway surfaces;
   a constant velocity universal joint is torque transmittably inserted into the wheel hub and is axially separably connected by a securing nut, a shoulder of an outer joint member of the constant velocity universal joint abuts against a larger end face of the inner ring;
   the larger end face of the inner ring is formed as a ground surface and an end face of the shoulder of the outer joint member abutted against the larger end face is formed as a ground surface or a lathe-turned surface, and the surface roughness of at least the larger end face of the inner ring is limited to a range within 0.1~0.3 microns.

2. The vehicle wheel bearing apparatus of claim 1, wherein the end face of the shoulder of the outer joint member is ground or lathe-turned, and the end face of the shoulder of the outer joint member abutted against the larger end face of the inner ring is formed with concentric grinding traces or turning traces.

3. The vehicle wheel bearing apparatus of claim 1, wherein an outer circumference of a shaft portion of the outer joint member is formed with a serration having a helix angle inclined at a predetermined angle relative to an axis of the shaft portion.

4. The vehicle wheel bearing apparatus of claim 1, wherein the inner member further comprises a pair of inner rings press fit onto the cylindrical portion of the wheel hub.

5. The vehicle wheel bearing apparatus of claim 1, wherein the outer member is integrally formed on its outer circumference with a body mounting flange, and the inner member including the wheel hub is directly formed on its outer circumference with an inner raceway surface arranged opposite to one of the double row outer raceway surfaces, and the inner ring formed on its outer circumference with the inner raceway surface arranged opposite to the other of the double row outer raceway surfaces.

6. The vehicle wheel bearing apparatus of claim 1, wherein a securing nut is fastened to the outer joint member at a predetermined fastening torque to connect the outer joint member to the wheel hub under a condition where a predetermined pre-pressure is applied to a bearing.

7. A vehicle wheel bearing apparatus comprising:
an outer member integrally formed with double row outer raceway surfaces on its inner circumference;
an inner member including a wheel hub and at least one inner ring, said wheel hub is integrally formed on one end with a wheel mounting flange and on an other end with a cylindrical portion, the at least one inner ring is press fit onto the cylindrical portion of the wheel hub, the inner member is formed with double row inner raceway surfaces arranged opposite to the double row outer raceway surfaces;
double row rolling elements are rollably contained between the double row outer and inner raceway surfaces;
a constant velocity universal joint is torque transmittably inserted into the wheel hub and is axially separably connected by a securing nut, a shoulder of an outer joint member of the constant velocity universal joint abuts against a larger end face of the inner ring;
at least the larger end face of the inner ring and an end face of the shoulder of the outer joint member abutted against the larger end face is lap finished, and the surface roughness of at least the larger end face of the inner ring is limited to a range less than 0.7 microns.

8. The vehicle wheel bearing apparatus of claim 7, wherein at least one abutting surface of the larger end face of the inner ring and the end face of the shoulder of the outer joint member is lap finished.

9. The vehicle wheel bearing apparatus of claim 7, wherein the larger end face of the inner ring is grounded and lap finished after the grinding.

* * * * *